United States Patent
Zhai et al.

(10) Patent No.: US 11,804,193 B1
(45) Date of Patent: Oct. 31, 2023

(54) INTERACTIVE DEMONSTRATION SYSTEM AND METHOD THEREOF BASED ON POWER SUPPLY INTELLIGENT BOARD

(71) Applicant: JIANGSU AUSTIN OPTRONICS TECHNOLOGY CO., LTD., Jiangsu (CN)

(72) Inventors: Xiaodong Zhai, Jiangsu (CN); Le Ru, Jiangsu (CN); Tao Ling, Jiangsu (CN); Jing Ling, Jiangsu (CN)

(73) Assignee: JIANGSU AUSTIN OPTRONICS TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/972,577

(22) Filed: Oct. 24, 2022

(30) Foreign Application Priority Data

Dec. 1, 2021 (CN) .......................... 202111446243.4

(51) Int. Cl.
  *G09G 3/36* (2006.01)
  *H02J 50/10* (2016.01)
  *H02J 50/80* (2016.01)

(52) U.S. Cl.
  CPC ................ *G09G 3/36* (2013.01); *H02J 50/10* (2016.02); *H02J 50/80* (2016.02); *G09G 2300/026* (2013.01); *G09G 2330/021* (2013.01)

(58) Field of Classification Search
  CPC ............... G09G 3/36; G09G 2300/026; G09G 2330/021; H02J 50/10; H02J 50/80
  See application file for complete search history.

(56) References Cited

U.S. PATENT DOCUMENTS

| 2014/0028244 | A1* | 1/2014 | Korekoda | H02J 50/80 320/108 |
| 2016/0118839 | A1* | 4/2016 | Lee | H02J 50/80 320/108 |
| 2021/0072801 | A1* | 3/2021 | Leopold | H02J 7/0042 |
| 2021/0281110 | A1* | 9/2021 | Lu | G06F 3/038 |
| 2022/0149646 | A1* | 5/2022 | Yang | H01F 38/14 |

FOREIGN PATENT DOCUMENTS

| CN | 102609232 | 7/2012 |
| CN | 103607710 | 2/2014 |
| CN | 113715548 | 11/2021 |

* cited by examiner

*Primary Examiner* — Premal R Patel
(74) *Attorney, Agent, or Firm* — JCIPRNET

(57) ABSTRACT

The disclosure provides an interactive demonstration system and a method thereof based on a power supply intelligent board. The system includes an intelligent board supporting wireless power supply, a plurality of wireless liquid crystal display screens, a handheld wireless intelligent terminal, and an application (APP) running on the handheld wireless intelligent terminal. Handheld intelligent terminals such as mobile phones are used for running the APP, and the broadcast contents of all the wireless liquid crystal display screens adsorbed on the intelligent board are controlled, configured, and transmitted in a wireless way, thereby realizing a low-cost and easy-to-interact interactive demonstration experience that integrates electronic display with traditional whiteboard display.

8 Claims, 5 Drawing Sheets

INTERACTIVE DEMONSTRATION SYSTEM AND METHOD THEREOF BASED ON POWER SUPPLY INTELLIGENT BOARD

CROSS-REFERENCE TO RELATED APPLICATION

This application claims the priority benefit of China application no. 202111446243.4, filed on Dec. 1, 2021. The entirety of the above-mentioned patent application is hereby incorporated by reference and made a part of this specification.

TECHNICAL FIELD

The present disclosure relates to the technical field of electronic display, especially an interactive demonstration system and a method thereof based on a power supply intelligent board.

BACKGROUND TECHNOLOGY

Whiteboards are widely used in enterprises, institutions, schools, etc. In order to increase interaction, information will be displayed by magnetically adsorbing magnetic labels on the whiteboards, but there is less information that can be displayed, and it is troublesome to update in the display process; and in the prior art, one liquid crystal display screen is often used for information display. Compared with the whiteboard, the liquid crystal display screen increases the amount of information, and can quickly update display information in the display process. However, there is only one liquid crystal display screen, and information that can be displayed in a single time is limited.

SUMMARY OF THE INVENTION

The technical problem to be solved by the present disclosure is to provide an interactive demonstration system and a method thereof based on a power supply intelligent board, which controls, configure and transmit the broadcast contents of all wireless liquid crystal display screens on the intelligent board capable of supporting wireless power support.

The present disclosure provides an interactive demonstration system based on a power supply intelligent board, comprising an intelligent board supporting wireless power supply, one or a plurality of wireless liquid crystal display screens arranged on the intelligent board, and a wireless intelligent terminal.

The intelligent board comprises a display board body, a plurality of wireless liquid crystal display screen placement areas arranged on the front of the display board body, a main control unit (MCU) and a first wireless communication module which are arranged on the back of the display board body (11); and the main control unit (MCU) is electrically connected to the first wireless communication module and communicates with the first wireless communication module through a serial port.

A wireless charging primary coil and a coil control module are arranged at positions, corresponding to each of the wireless liquid crystal display placement areas, of the back of the display board body; the wireless charging primary coil is connected to the coil control module; and each wireless charging primary coil has its own unique primary coil identifier (ID) stored in the control module, and the coil control module communicates with the main control unit (MCU) through inter-integrated circuit (I2C).

The intelligent board is also provided with a two-dimensional code which contains the ID of the intelligent board, and the mac address, access mode and access password information of the first wireless communication module; and the ID information of the intelligent board contains the overall layout of the wireless liquid crystal display screen placement areas and the ID of the primary coil corresponding to each wireless liquid crystal display screen placement area.

Each of the wireless liquid crystal display screens comprises a display screen body, a screen driver main control unit (MCU), a display screen control module, and a second wireless communication module which are internally arranged in the display screen body, and a wireless charging secondary coil which is arranged on the back of the display screen body. The screen driver MCU 22 is connected to the display screen control module 24 and the second wireless communication module 25 respectively. The display screen control module is connected to the wireless charging secondary coil, and the ID of the wireless liquid crystal display screen is stored in the display screen control module.

After each of the wireless liquid crystal display screens is placed in each of the wireless liquid crystal display screen placement areas, the wireless charging secondary coil and the wireless charging primary coil interact to power up the wireless liquid crystal display screen and perform data transmission, and the data contains the ID of the wireless liquid crystal display screen, and the mac address, the access mode and access passwords of the second wireless communication module.

The coil control module acquires the ID of the wireless liquid crystal display screen at a corresponding position thereof, the mac address, access mode and access passwords of the second wireless communication module through the wireless charging secondary coil, and the main control unit (MCU) acquires the IDs of a group of primary coils, the ID of the wireless liquid crystal display screen, and the mac address, access mode and access passwords of the second wireless communication module through each coil control module.

The wireless intelligent terminal comprises a camera module, a third wireless communication module and an application (APP) installed and running on the wireless intelligent terminal.

The APP opens the camera module to scan the two-dimensional code and acquire the ID of the intelligent board, and the mac address, access mode and access password information of the first wireless communication module. The wireless intelligent terminal is connected to the first wireless communication module through the third wireless communication module so as to acquire the ID of each primary coil stored in the main control unit (MCU), and the ID of the wireless liquid crystal display screen corresponding to each primary coil, and the mac address, access mode and access passwords of the second wireless communication module.

Further, first magnetic materials are also arranged at positions, corresponding to each of the wireless liquid crystal display screen placement areas, of the back of the display board body, and second magnetic materials are also arranged on the back of the display screen body; and when the wireless liquid crystal display screen is placed in the wireless liquid crystal display screen placement area, the first magnetic materials and the second magnetic materials attract each other, so that the wireless liquid crystal display screen is adsorbed on the intelligent board.

Further, the second magnetic materials are four circular magnetic sheets, and form a rectangle on the back of the display screen body in a surrounding manner, the first magnetic materials are four circular magnetic sheets, and the shape formed by the first magnetic materials in a surrounding manner is the same as the shape formed by the second magnetic materials in a surrounding manner.

Further, the first wireless communication module comprises a first wireless fidelity (WIFI) module, the second wireless communication module comprises a second WIFI module, and the third wireless communication module comprises a third WIFI module.

Further, the first WIFI module arranged on the back of the intelligent board, the second WIFI module on the wireless liquid crystal display screen, and the third WIFI module on the wireless intelligent terminal all adopt WiFi6 standard modules conforming to the 802.11ax standard.

Further, the first wireless communication module further comprises a first Bluetooth module, and the third wireless communication module further comprises a second Bluetooth module.

Further, the display board body is the whiteboard.

An interactive demonstration method based on the power supply intelligent board is based on the interactive demonstration system based on the power supply intelligent board and comprises the following steps:

step 1: the intelligent board is provided with the two-dimensional code which contains the ID of the intelligent board, the mac address, access mode and access password information of the WIFI module on the intelligent board, wherein the ID information of the intelligent board contains the overall layout of the wireless liquid crystal display screen placement areas and the ID of the primary coil corresponding to each wireless liquid crystal display screen placement area.

Step 2: the wireless liquid crystal display screen is fixed in the wireless liquid crystal display screen placement area on the front of the intelligent board, and the wireless charging secondary coil of the wireless liquid crystal display screen and the wireless charging primary coil on the back of the intelligent board interact to power up the wireless liquid crystal display screen.

Step 3: the wireless charging primary coil on the back of the intelligent board and the wireless charging secondary coil of the wireless liquid crystal display screen interact for data transmission, the coil control module acquires the ID of the corresponding wireless liquid crystal display screen, and the mac address, access mode and access passwords of the second wireless communication module through the primary coil, and the main control unit (MCU) acquires the IDs of a group of primary coils, the ID of the wireless liquid crystal display screen, and the mac address, access mode and access passwords of the second wireless communication module through each coil control module.

step 4: the wireless intelligent terminal runs the APP, and the APP opens the camera module of the intelligent terminal to scan the two-dimensional code pasted on the intelligent board and identify the ID of the intelligent board and the connecting information of the first wireless communication module, is connected to the first wireless communication module and interacts with the main control unit (MCU) to acquire the ID of each group of primary coils, the ID of the wireless liquid crystal display screen, and the mac address, access mode and access passwords of the second wireless communication module.

The APP integrates the acquired data to obtain the overall layout of the wireless liquid crystal display screen placement areas, the ID of each of the primary coils corresponding to each wireless liquid crystal display screen placement area, the ID of the wireless liquid crystal display screen, and the mac address, access mode and access passwords of the second wireless communication module.

step 5: the wireless intelligent terminal runs the APP, wherein the operation interface of the APP is the overall layout of the wireless liquid crystal display screen placement areas, and the wireless liquid crystal display screen in one wireless liquid crystal display screen placement area is selected for connection; and the APP completes the connection with the second wireless communication module of the selected wireless liquid crystal display screen through the acquired ID of the wireless liquid crystal display screen, and the mac address, access mode and access password information of the second wireless communication module, selects content needing to be synchronized locally, selects and uploads the content to the selected wireless liquid crystal display screen.

The present disclosure has the beneficial effects that according to the present technical scheme, based on the intelligent board capable of supporting wireless charging, the wireless intelligent terminal runs the APP, so that the content can be uploaded to different wireless liquid crystal display screens as required and is played, and a fast, flexible and easy-to-operate interactive demonstration experience can be realized.

DESCRIPTION OF THE EMBODIMENTS

Specific implementation modes of an interactive demonstration system and method based on a power supply intelligent board which are provided by the present invention are described in detail below in combination with the accompanying drawings.

Figure 1:
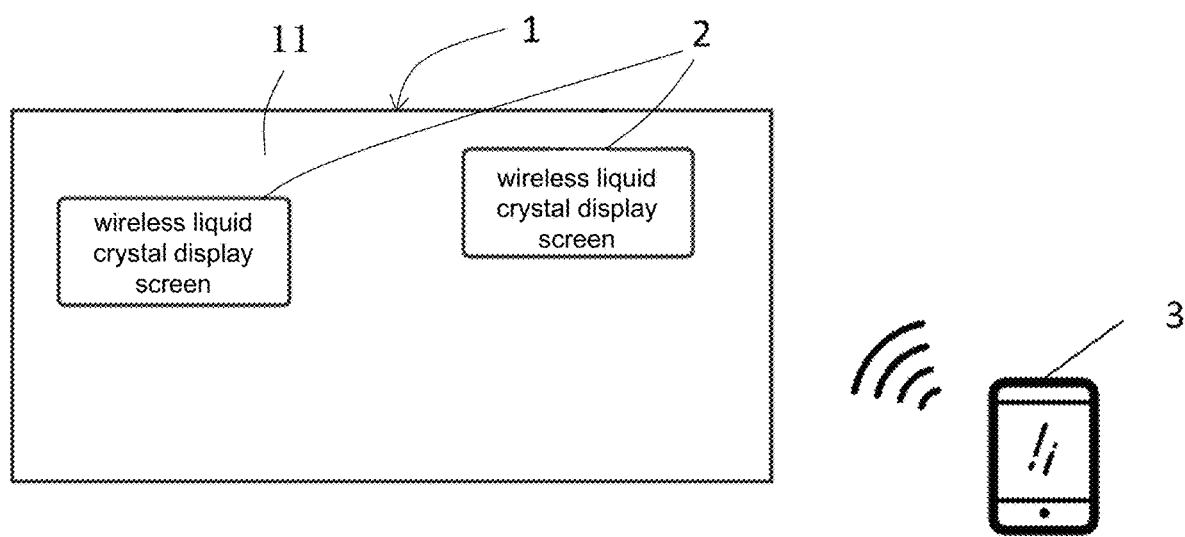
FIG. 1 is a schematic diagram of an interactive demonstration system according to the present disclosure.

As shown in FIG. 1, the interactive demonstration system based on the power supply intelligent board provided by the present disclosure comprises an intelligent board 1 supporting wireless power supply, one or a plurality of wireless liquid crystal display screens 2 arranged on the intelligent board, and a wireless intelligent terminal 3. The wireless intelligent terminal is in wireless connection with the wireless liquid crystal display screens 2 and transmits data to the wireless liquid crystal display screens 2. In the present embodiment, the wireless intelligent terminal is a handheld wireless intelligent terminal.

The intelligent board 1 comprises a display board body 11, a plurality of wireless liquid crystal display screen placement areas 13 arranged on the front of the display board body 11, a main control unit (MCU) 12 and a first wireless communication module 14 which are arranged on the back of the display board body 11, and the main control unit (MCU) 12 is electrically connected to the first wireless communication module 14 and communicates with the first wireless communication module 14 through a serial port. The first wireless communication module 14 comprises a first WIFI module, or the first wireless communication module 14 comprises a first WIFI module and a Bluetooth module.

A wireless charging primary coil 131, a coil control module 132 and first magnetic materials 133 are arranged at positions, corresponding to each wireless liquid crystal display screen placement area 13, of the back of the display board body 11; the wireless charging primary coil 131 is connected to the coil control module 132, and each wireless charging primary coil 131 has its own unique primary coil ID stored in the control module 132; and the coil control module 132 communicates with the main control unit (MCU) 12 through I2C.

Figure 2:
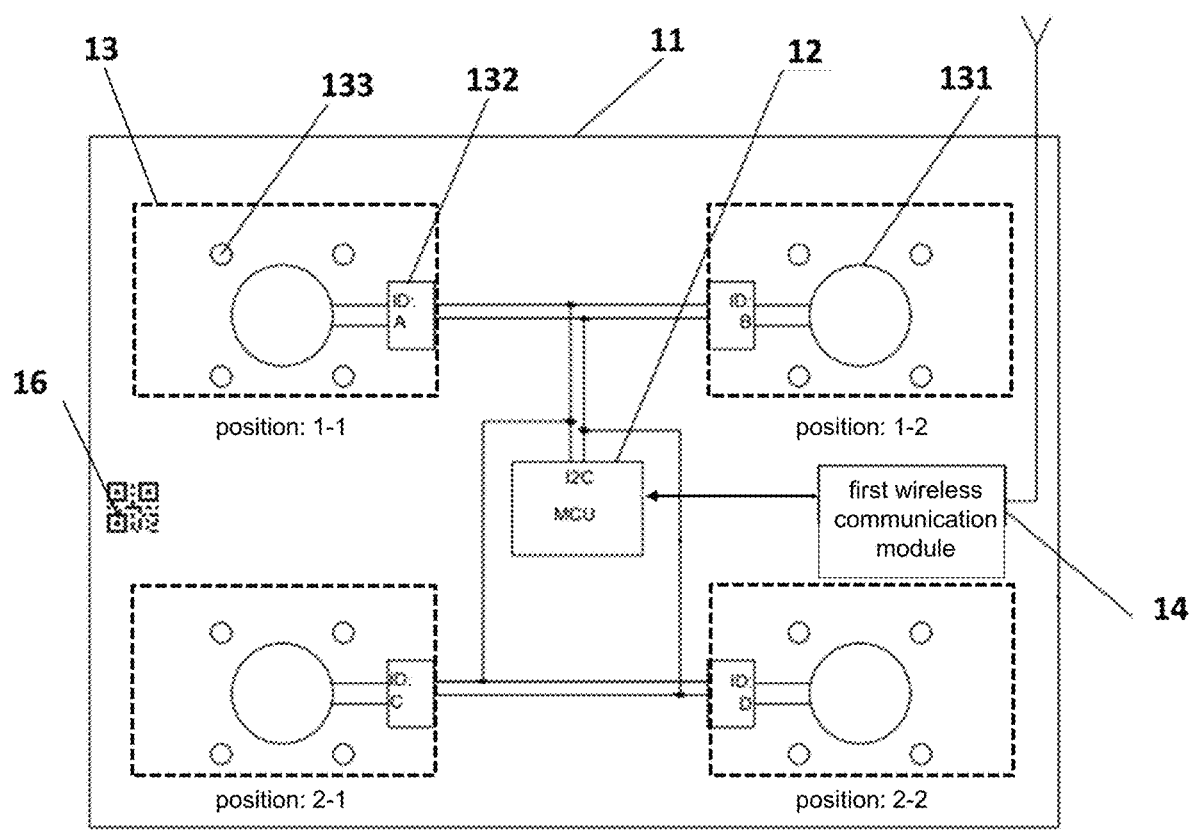
FIG. 2 is a structural diagram of the back of the intelligent board with 2×2 wireless liquid crystal display screen placement areas.

The intelligent board 1 is provided with a two-dimensional code 16 which contains the ID of the intelligent board, and the mac address, access mode and access password information of the first wireless communication module; and the ID information of the intelligent board contains the overall layout of the wireless liquid crystal display screen placement areas and the ID of the primary coil corresponding to each wireless liquid crystal display screen placement area. FIG. 2 is a structural diagram of the back of the intelligent board with 2×2 wireless liquid crystal display screen placement areas. The overall layout of the wireless liquid crystal display screen placement areas in the present embodiment is a 2×2 matrix, and a matrix layout of other sizes such as 2×3 and 3×3 can also be used, and an overall layout of other shapes can also be used.

Figure 3:
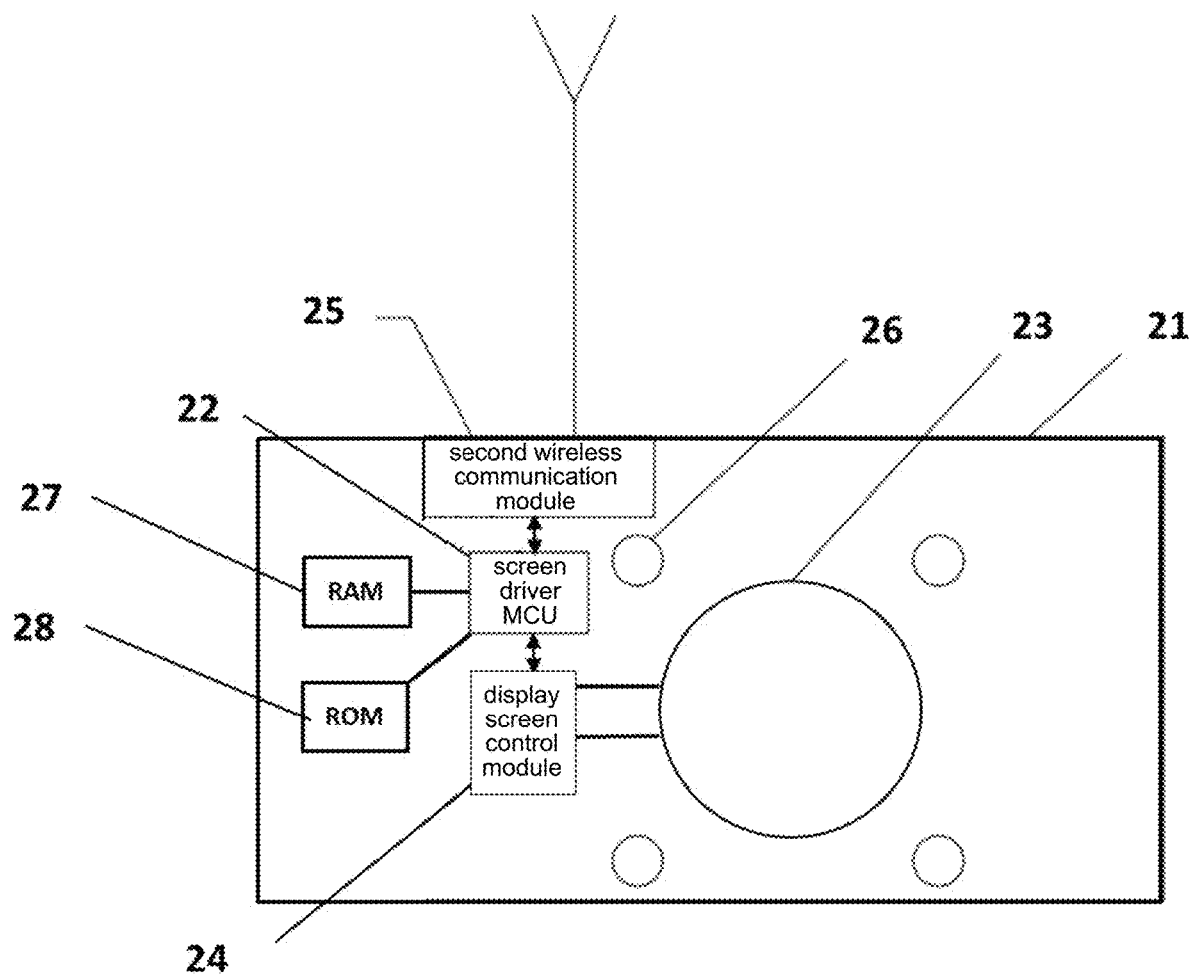
FIG. 3 is a structural diagram of a wireless liquid crystal display screen in an interactive demonstration system according to the present disclosure.

As shown in FIG. 3, the wireless liquid crystal display screen 2 comprises a display screen body 21, a screen driver MCU 22, a display screen control module 24, and a second wireless communication module 25 which are internally arranged in the display screen body 21, and a wireless charging secondary coil 23 and second magnetic materials 26 which are arranged on the back of the display screen body. The screen driver MCU 22 is connected to the display screen control module 24 and the second wireless communication module 25 respectively; and the display screen control module 24 is connected to the wireless charging secondary coil 23. The second wireless communication module 25 comprises a second WIFI module.

The second wireless communication module 25 and the screen driver MCU 22 are electrically connected and transmit data through a serial port; the screen driver MCU 22 is also electrically connected to the display screen control module 24, and data transmission is realized through the serial port; and the ID of the wireless liquid crystal display screen is stored in the display screen control module 24.

The interior of the wireless liquid crystal display screen 2 also includes a random access memory (RAM) 27 used for temporarily storing file data that needs to be displayed; the interior of the wireless liquid crystal display screen 2 also includes a read only memory (ROM) 28 used for storing an embedded operating system of the wireless liquid crystal display screen and software that can support broadcasting the content in the RAM; and the random access memory 27 and the read only memory 28 are both electrically connected to the screen driver MCU 22.

When the wireless liquid crystal display screen 2 is placed in the wireless liquid crystal display screen placement area 13, the first magnetic materials 133 and the second magnetic materials 26 attract each other, so that the wireless liquid crystal display screen 2 is adsorbed on the intelligent board; the wireless charging secondary coil 23 and the wireless charging primary coil 131 interact to power up the wireless liquid crystal display screen 2 and perform data transmission; and the data contains the ID of the wireless liquid crystal display screen, and the mac address, the access mode and access passwords of the second wireless communication module.

The coil control module 132 acquires the ID of the wireless liquid crystal display screen 2, which is at a corresponding position, the mac address, access mode and access passwords of the second wireless communication module through the wireless charging secondary coil 23. The main control unit MCU 12 acquires the IDs of a group of primary coils, the ID of the wireless liquid crystal display screen, the mac address, access mode and access passwords of the second wireless communication module through each coil control module 132.

The main control unit MCU 12 includes a memory used for storing the IDs of all the primary coils, the unique ID of the wireless liquid crystal display screen 2, the mac address, access modes, and access passwords of the second wireless communication module. Each of the wireless liquid crystal display screen placement areas 13 corresponds to the IDs of a group of primary coils, the ID of the wireless liquid crystal display screen, and the mac address, access mode, and access passwords of the second wireless communication module.

As shown in FIG. 2, the second magnetic materials 26 are four circular magnetic sheets, and form a rectangle on the back of the display panel body 21 in a surrounding manner. The first magnetic materials 133 are other four circular magnetic sheets, and the shape formed by the first magnetic materials in a surrounding manner is the same as the shape formed by the second magnetic materials in a surrounding manner.

The wireless intelligent terminal 3 includes a camera module, a third wireless communication module, and the APP installed and running on the wireless intelligent terminal. The APP is connected to the first wireless communication module on the intelligent board for communication and data transmission. The APP can synchronously display placement positions 13 where the wireless liquid crystal display screens 2 placed on the intelligent board 1 are located, controls and configures each wireless liquid crystal display screen 2 on the intelligent board 1 and transmits files; and the APP has the function of opening the camera module to scan the two-dimensional code 16 of the intelligent board 1, and also has the functions of accessing local picture files and video files and opening the camera to take photos. The third wireless communication module comprises a third WIFI module, or the third wireless communication module comprises a third WIFI module and a second Bluetooth module. The first WIFI module arranged on the back of the intelligent board, the second WIFI module of the wireless liquid crystal display screen, and the third WIFI module of the wireless intelligent terminal all adopt WiFi6 standard modules conforming to the 802.11ax standard.

The first WIFI module arranged on the back of the intelligent board 1, the second WIFI module on the wireless liquid crystal display screen 2, and the third WIFI module on the wireless intelligent terminal 3 are all WiFi6 standard modules conforming to the 802.11ax standard.

The APP starts the camera module to scan the two-dimensional code 16 on the intelligent board 1 to acquire the ID of the intelligent board and the mac address, access mode and access password information of the first wireless communication module, and the APP acquires the ID of the intelligent board, that is, the layout of the wireless liquid crystal display screen placement areas and the ID of the primary coil corresponding to each wireless liquid crystal display screen placement area.

The APP acquires the mac address, access mode and access password information of the first wireless communication module, thus realizing the connection between the third wireless communication module of the wireless intelligent terminal and the first wireless communication module 14; the APP acquires the IDs of each group of primary coils stored in the main control unit (MCU) 12, the IDs of the wireless liquid crystal display screens, and the mac address, access mode and access passwords of the second wireless communication module through the first wireless communication module 14; and after integrating the acquired data, the APP acquires the overall layout of each wireless liquid crystal display screen placement area, the ID of the primary coil corresponding to each wireless liquid crystal display screen placement area, the IDs of the wireless liquid crystal display screens, and the mac address, access mode and access passwords of the second wireless communication module. The APP synchronously displays the wireless liquid crystal display screen placement areas on the intelligent board and the corresponding wireless liquid crystal display screens 2 in the areas, controls and configures each wireless liquid crystal display screen 2 on the intelligent board through the third wireless communication module and transmits files.

Figure 5:
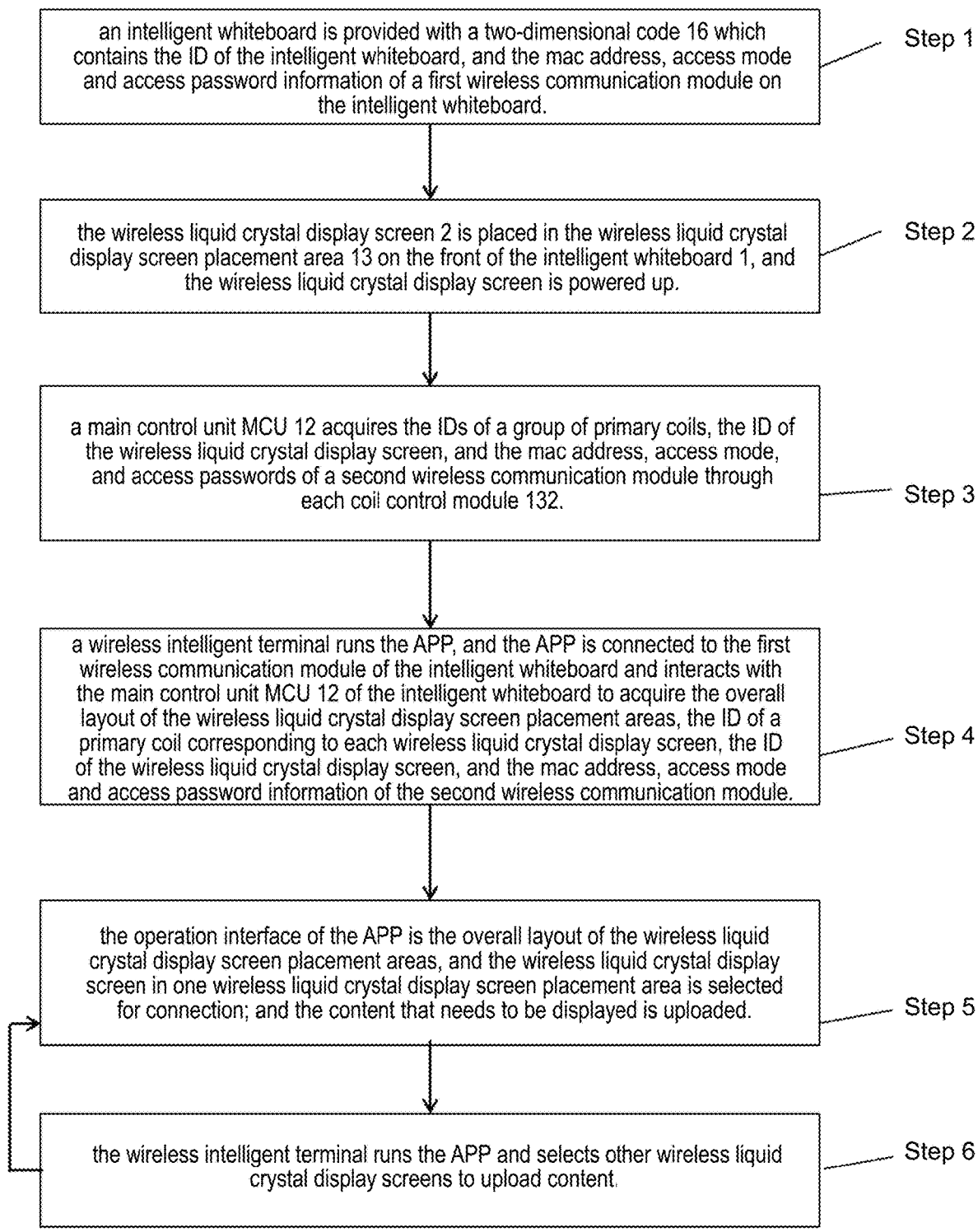
FIG. 5 is a flowchart of an interactive demonstration method according to the present disclosure.

The present disclosure provides an interactive demonstration method based on a power supply intelligent board, a specific implementation of which is as shown in FIG. 5, comprising the following steps:

step 1: the intelligent board is provided with the two-dimensional code 16 which contains the ID of the intelligent board, and the mac address, access mode and access password information of the first wireless communication module on the intelligent board, wherein the ID information of the intelligent board contains the overall layout of the wireless liquid crystal display screen placement area and the ID of the primary coil corresponding to each wireless liquid crystal display screen placement area.

Step 2: The wireless liquid crystal display screen 2 is placed in the wireless liquid crystal display screen placement area 13 on the front of the intelligent board 1, and the second magnetic materials 26 on the back of the wireless liquid crystal display screen 2 interact with the first magnetic materials 133 on the back of the intelligent board; the wireless liquid crystal display screen 2 is adsorbed in the wireless liquid crystal display screen placement area 13 on the front of the intelligent board 1; and the wireless charging secondary coil 23 of the wireless liquid crystal display screen 2 and the wireless charging primary coil 131 on the back of the intelligent board interact to power up the wireless liquid crystal display screen 2; and the screen driver MCU 22 internally arranged in the liquid crystal display screen 2 starts to work and run the operating system and broadcast program in the ROM.

Step 3: the wireless charging primary coil 131 on the back of the intelligent board 1 and the wireless charging secondary coil 23 of the wireless liquid crystal display screen 2 interact for data transmission, the ID of the primary coil and the data acquired through the primary coil are stored in the memory of the main control unit (MCU) of the intelligent board, the coil control module 132 acquires the ID of the corresponding wireless liquid crystal display screen, and the mac address, access mode, and access passwords of the second wireless communication module through the wireless charging primary coil 131, and the main control unit (MCU) 12 acquires the IDs of a group of primary coils, the ID of the wireless liquid crystal display screen, and the mac address, access mode, and access passwords of the second wireless communication module through each coil control module 132.

Step 4: the wireless intelligent terminal runs the APP, the APP opens the camera of the intelligent terminal to scan the two-dimensional code 16 pasted on the intelligent board and identify the ID of the intelligent board and the connecting information of the first wireless communication module, which comprises the layout of the wireless liquid crystal display screen placement areas, the ID of the primary coil corresponding to each wireless liquid crystal display screen placement area, and the mac address, access mode and access passwords of the second wireless communication module; and the APP is connected to the first wireless communication module 14 of the intelligent board and interacts with the main control unit (MCU) 12 of the intelligent board to acquire the IDs of each group of primary coils, the IDs of the wireless liquid crystal display screen, and the mac address, access mode and access password information of the second wireless communication module.

The APP integrates the acquired data to obtain the overall layout of the wireless liquid crystal display screen placement areas, the ID of each of the primary coils corresponding to each wireless liquid crystal display screen placement area, the ID of the wireless liquid crystal display screen, and the mac address, access mode and access passwords of the second wireless communication module.

Figure 4:
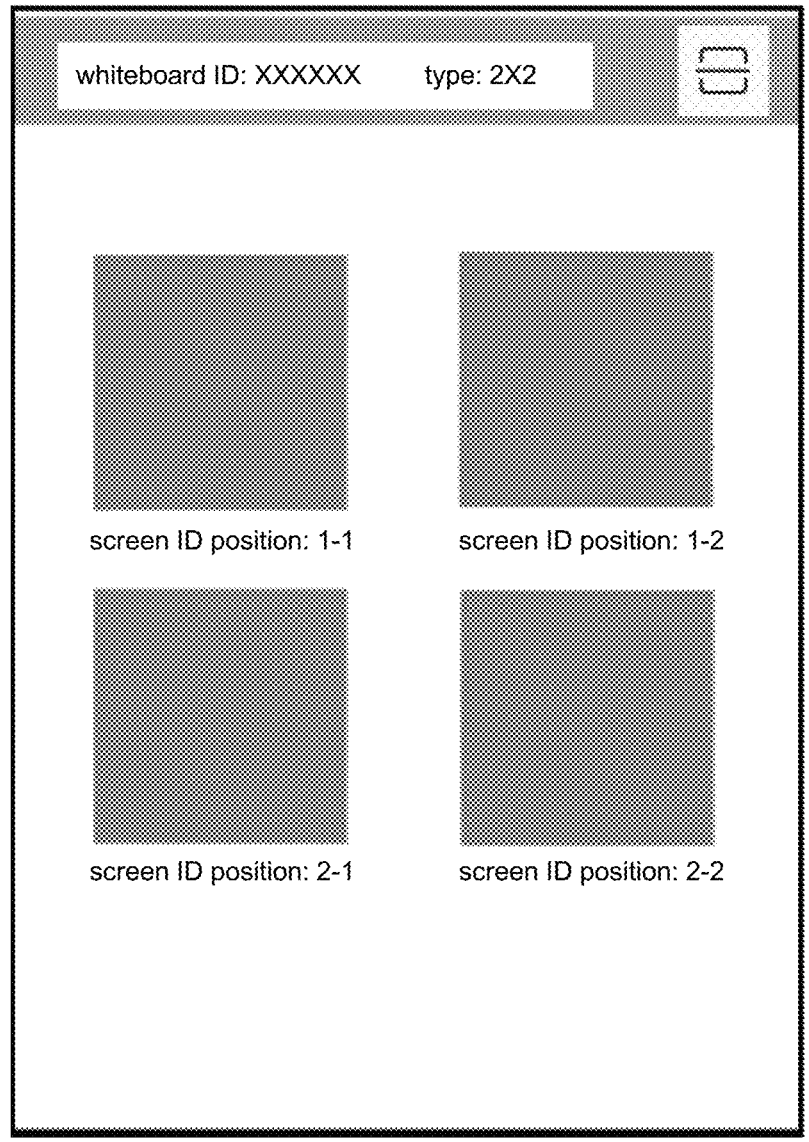
FIG. 4 is a functional main diagram of a wireless intelligent terminal running an application (APP) according to the present disclosure.

Step 5. the wireless intelligent terminal runs the APP, as shown in FIG. 4, the operation interface of the APP is the overall layout of the wireless liquid crystal display screen placement areas, and the wireless liquid crystal display screen in one wireless liquid crystal display screen placement area is selected for connection; the APP completes the connection with the second wireless communication module 25 of the selected wireless liquid crystal display screen 2 through the acquired ID of the wireless liquid crystal display screen, and the mac address, access mode and access password information of the second wireless communication module; and the APP selects content needing to be synchronized locally, selects and uploads the content to the RAM of the selected wireless liquid crystal display screen 2; and the screen driver MCU of the wireless liquid crystal display screen 2 runs the operating system and broadcast program in the ROM to broadcast the newly uploaded content in the RAM.

Step 6. the wireless intelligent terminal runs the APP and selects other wireless liquid crystal display screens 2 to upload content, and the above step 5 is repeated.

The above mentioned is only a preferred implementation of the present invention. It should be noted that those ordinarily skilled in the art can further make several improvement and modifications without departing from the principle of the present invention, and the improvement and modifications shall also be regarded as a protection scope of the present invention.

What is claimed is:

1. An interactive demonstration system based on a power supply intelligent board, comprising an intelligent board supporting wireless power supply, one or a plurality of wireless liquid crystal display screens arranged on the intelligent board, and a wireless intelligent terminal, wherein the intelligent board comprises a display board body, a plurality of wireless liquid crystal display screen placement areas arranged on a front of the display board body, a main control unit (MCU) and a first wireless communication module which are arranged on a back of the display board body, and the main control unit is electrically connected to the first wireless communication module and communicates with the first wireless communication module through a serial port;

each of wireless charging primary coils and each of coil control modules are respectively arranged at positions, corresponding to each of the wireless liquid crystal display screen placement areas, of the back of the display board body; each of the wireless charging primary coil is connected to each of the coil control module respectively; and the coil control modules communicate with the main control unit through an inter-integrated circuit (I2C);

the intelligent board is also provided with a two-dimensional code which contains an identifier (ID) of the intelligent board, and a mac address, an access mode and an access password information of the first wireless communication module; an ID information of the intelligent board contains an overall layout of the wireless liquid crystal display screen placement areas and an ID of primary coils corresponding to each of the wireless liquid crystal display screen placement areas;

each of the wireless liquid crystal display screens comprises a display screen body, a screen driver main control unit, a display screen control module, and a second wireless communication module which are internally arranged in the display screen body, and a wireless charging secondary coil which is arranged on a back of the display screen body; the screen driver main control unit is connected to the display screen control module and the second wireless communication module respectively; the display screen control module is connected to the wireless charging secondary coil, and an ID of the wireless liquid crystal display screens is stored in the display screen control module;

after one of the wireless liquid crystal display screens is placed in of the wireless liquid crystal display screen placement areas, the wireless charging secondary coil and the wireless charging primary coil, which are corresponding to one of the wireless liquid crystal display screen placement areas, interact to power up the wireless liquid crystal display screens and perform data transmission, and data contains the ID of the wireless liquid crystal display screens, and the mac address, the access mode and access passwords of the second wireless communication module;

the coil control modules acquire the ID of the wireless liquid crystal display screens at a corresponding position thereof, the mac address, the access mode and the access passwords of the second wireless communication module through the wireless charging secondary coil, and the main control unit acquires identifiers (IDs) of groups of the primary coils, the ID of the wireless liquid crystal display screens, and the mac address, the access mode and the access passwords of the second wireless communication module through each of the coil control modules;

the wireless intelligent terminal comprises a camera module, a third wireless communication module and an application (APP) installed and running on the wireless intelligent terminal;

the application opens the camera module to scan the two-dimensional code and acquire the ID of the intelligent board, and the mac address, the access mode and the access password information of the first wireless communication module; and the wireless intelligent terminal is connected to the first wireless communication module through the third wireless communication module so as to acquire the ID of each of the primary coils stored in the main control unit, and the ID of the wireless liquid crystal display screens corresponding to each of the primary coils, and the mac address, the access mode and the access passwords of the second wireless communication module; and an operation interface of the APP is the overall layout of the wireless liquid crystal display screen placement areas, and the wireless liquid crystal display screens in one of the wireless liquid crystal display screen placement areas is selected for connection.

2. The interactive demonstration system based on the power supply intelligent board of claim 1, wherein first magnetic materials are also arranged at the positions, corresponding to each of the wireless liquid crystal display screen placement areas, of the back of the display board body, and second magnetic materials are also arranged on the back of the display screen body; and when one of the wireless liquid crystal display screens is placed in the one of the wireless liquid crystal display screen placement areas, the first magnetic materials and the second magnetic materials attract each other, so that one of the wireless liquid crystal display screens is adsorbed on the intelligent board.

3. The interactive demonstration system based on the power supply intelligent board of claim 2, wherein the second magnetic materials are four circular magnetic sheets, and form a rectangle on the back of the display screen body in a surrounding manner, the first magnetic materials are four circular magnetic sheets, and the shape formed by the first magnetic materials in a surrounding manner is the same as the shape formed by the second magnetic materials in a surrounding manner.

4. The interactive demonstration system based on the power supply intelligent board of claim 1, wherein the first wireless communication module comprises a first wireless fidelity (WIFI) module, the second wireless communication module comprises a second WIFI module, and the third wireless communication module comprises a third WIFI module.

5. The interactive demonstration system based on the power supply intelligent board of claim 4, wherein the first WIFI module, the second WIFI module, and the third WIFI module all adopt WiFi6 standard modules conforming to the 802.11ax standard.

6. The interactive demonstration system based on the power supply intelligent board of claim 4, wherein the first wireless communication module further comprises a first Bluetooth module, and the third wireless communication module further comprises a second Bluetooth module.

7. The interactive demonstration system based on the power supply intelligent board of claim 1, wherein the display board body is a whiteboard.

8. An interactive demonstration method based on the power supply intelligent board, wherein the interactive demonstration method is based on the interactive demonstration system based on the power supply intelligent board of claim 1 and comprises the following steps:
- step 1: the intelligent board is provided with the two-dimensional code which contains the ID of the intelligent board, the mac address, the access mode, and the access password information of a WIFI module on the intelligent board, wherein the ID information of the intelligent board contains the overall layout of the wireless liquid crystal display screen placement areas and the ID of the primary coils corresponding to each of the wireless liquid crystal display screen placement areas;
- step 2: the wireless liquid crystal display screens are fixed in the wireless liquid crystal display screen placement areas on a front of the intelligent board, and the wireless charging secondary coil of the wireless liquid crystal display screen and the wireless charging primary coils on a back of the intelligent board interact to power up the wireless liquid crystal display screens;
- step 3: the wireless charging primary coils on the back of the intelligent board and the wireless charging secondary coil of the wireless liquid crystal display screens interact for data transmission, the coil control modules acquire the ID of the wireless liquid crystal display screens, which are corresponding to the wireless charging primary coils, and the mac address, the access mode and the access passwords of the second wireless communication module through the wireless charging primary coils, and the main control unit acquires the IDs of the groups of the primary coils, the ID of the wireless liquid crystal display screens, and the mac address, the access mode and the access passwords of the second wireless communication module through each of the coil control modules;
- step 4: the wireless intelligent terminal runs the APP, and the APP opens the camera module to scan the two-dimensional code on the intelligent board and identify the ID of the intelligent board and a connecting information of the first wireless communication module, is connected to the first wireless communication module and interacts with the main control unit to acquire the IDs of each of the groups of the primary coils, the IDs of the wireless liquid crystal display screens, and the mac address, the access mode and the access passwords of the second wireless communication module;
- the APP integrates the data, which are acquired, to obtain the overall layout of the wireless liquid crystal display screen placement areas, the ID of each of the primary coils corresponding to each of the wireless liquid crystal display screen placement areas, the IDs of the wireless liquid crystal display screens, and the mac address, the access mode, and the access passwords of the second wireless communication module; and
- step 5: the wireless intelligent terminal runs the APP, wherein the operation interface of the APP is the overall layout of the wireless liquid crystal display screen placement areas, and the wireless liquid crystal display screens in one of the wireless liquid crystal display screen placement areas is selected for connection; and the APP completes the connection with the second wireless communication module of the wireless liquid crystal display screens, which are selected, through the acquired the ID of the wireless liquid crystal display screens, and the mac address, the access mode and the access password information of the second wireless communication module, selects content needing to be synchronized locally, selects and uploads the content to the wireless liquid crystal display screens, which are selected.

* * * * *